April 5, 1949.  W. A. WILLIAMS  2,466,567
HARDNESS TESTER
Filed Feb. 5, 1947  2 Sheets-Sheet 1
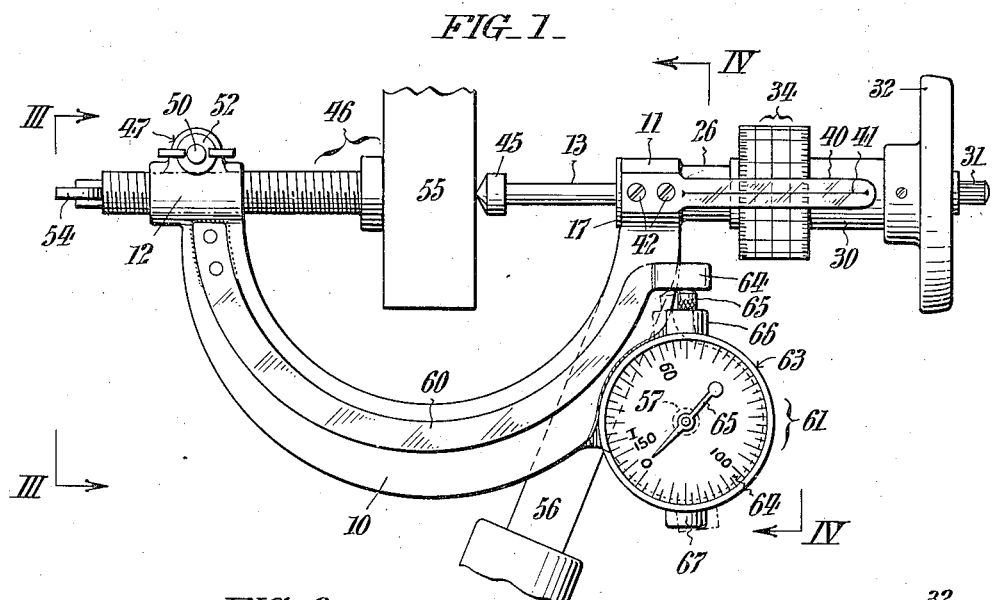
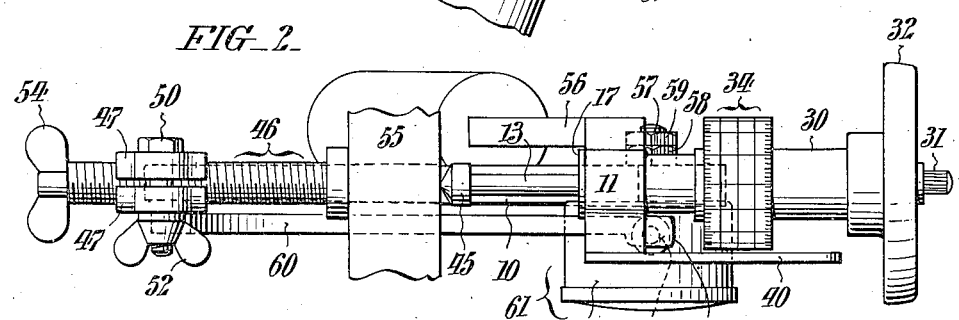
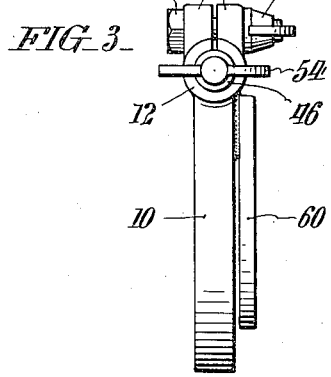
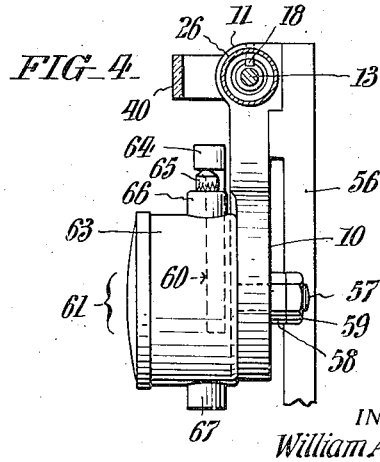
WITNESSES
Hubert Fuchs
Thomas W. Kerr Jr.
INVENTOR:
William A. Williams,
BY Paul & Paul
ATTORNEYS.

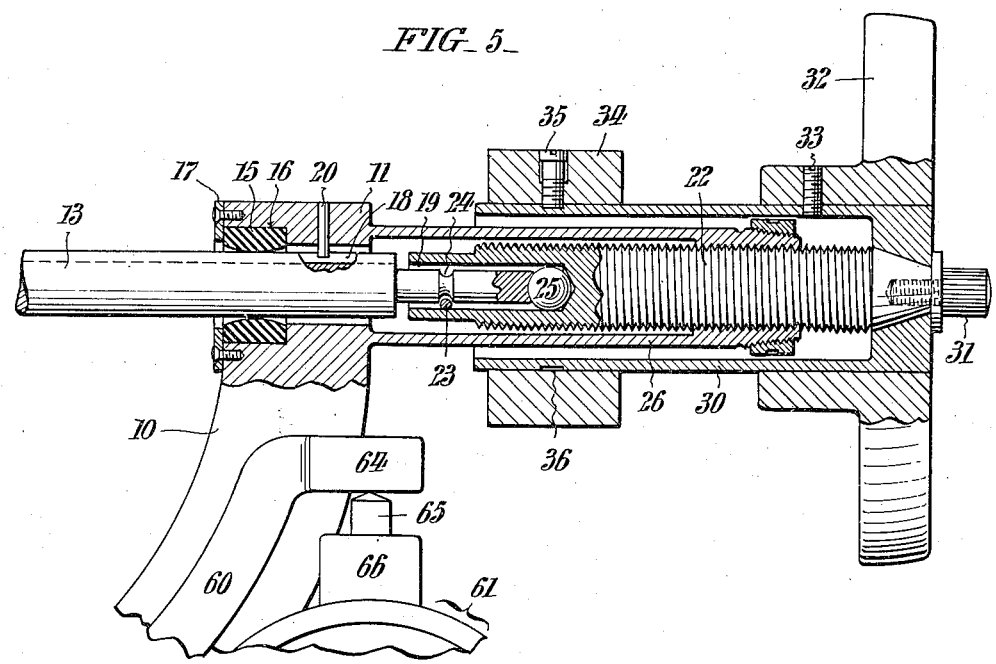
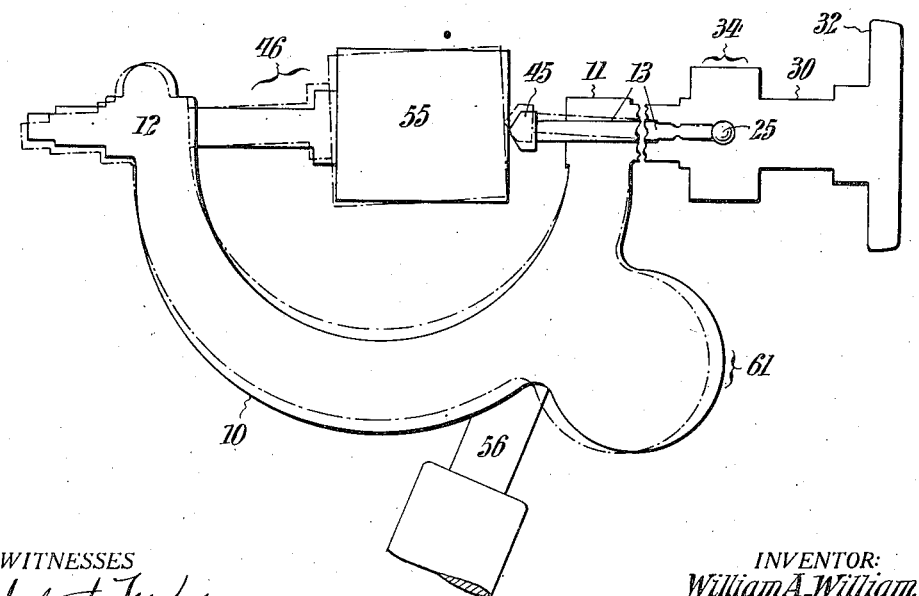

Patented Apr. 5, 1949

2,466,567

UNITED STATES PATENT OFFICE 2,466,567

HARDNESS TESTER

William A. Williams, Philadelphia, Pa., assignor to The American Pulley Company, Philadelphia, Pa., a corporation of Pennsylvania Application February 5, 1947, Serial No. 726,479

6 Claims. (Cl. 73—81)

This invention relates to hardness testers. Cumbersome and non-portable hardness testers which operate with a high standard of accuracy are well known to the art. However, it is frequently impossible to efficiently bring large and heavy materials to a non-portable hardness tester and the obtaining of a small piece of material as a specimen is difficult and time consuming. It has long been desirable to provide a portable hardness tester which could be taken to the material to be tested without the bother of preparing specimens. Portable hardness testers have been suggested in the prior art but the problem of how to attain accuracy remains. For example, in U. S. Patent No. 1,973,333, issued to P. Craemer on September 11, 1934, it is expressly recognized that a high standard of accuracy is not to be expected from the hardness tester there shown for the device is limited to a "substantially accurate hardness test" (page 1, lines 11–12 of the specification). Thus the objective to which the invention hereinafter described is directed is the provision of a portable hardness tester which will operate on a standard of accuracy equal or superior to the cumbersome and non-portable hardness testers now known to the art.

Another object of this invention is a structural form which is simple, rugged and inexpensive of construction.

Still other objects and advantages of this invention will become apparent from the following detailed description of a preferred form which is shown in the accompanying drawings.

Fig. 1 is a view in side elevation of a hardness tester embodying my invention.

Fig. 2 is a top view of the invention of Fig. 1.

Fig. 3 is an end view of the invention shown in Fig. 1 taken as indicated by the arrows III—III in Fig. 1.

Fig. 4 is a transverse sectional view taken as indicated by the arrows IV—IV in Fig. 1.

Fig. 5 is a vertical detail sectional view showing the structure of the penetrator spindle and its assembly.

Fig. 6 is an exaggerated diagrammatic view showing the operation of the penetrator spindle as the frame is distorted.

In describing the preferred embodiment of this invention illustrated in the drawings, a specific terminology will be resorted to for the sake of clarity. However, it is to be understood that there is no intention of being limited to the specific terms so selected but on the contrary each specific term is intended to include all technical equivalents which operate in a similar manner to accomplish a similar purpose.

As shown in Figs. 1 and 2 of these drawings my improved hardness tester has a relatively small semi-circular frame 10 formed from hardened material having a definite degree of flexibility, preferably tempered tooled steel, with bosses 11 and 12 formed at its opposite extremities. The boss 11 is apertured to receive therethrough a penetrator spindle 13. The penetrator spindle 13 is supported in a flexible bearing 15 which is seated in a recess 16 formed in the boss 11, a removable retaining ring 17 being provided to hold the flexible bearing 15 in place. The flexible bearing 15 may be formed of synthetic rubber or of like material well known to the art. It will be noted from Fig. 5 that the inside surface of the flexible bearing 15 is curved to facilitate the free angular motion of the spindle 13 as shown in Fig. 6. In order to prevent the spindle 13 from rotating about its axis, a pin 20 is provided, the pin 20 being mounted in the boss 11 and extending into a longitudinal channel or groove 18 formed in the surface of the penetrator spindle 13. From Fig. 5 it will be observed that an end of the spindle 13 extends into a tapped bore or cylindrical opening 19 formed in the inner end of a threaded member 22 and is held in place therein by a pin 23. The pin 23 is mounted transversely in the threaded member 22 and extends into a circumferential groove 24 formed around the spindle 13 to receive the pin 23.

The end of the spindle 13 within the tapped bore 19 of the threaded member 22 rides on a ball 25 seated in the bottom of the tapped bore 19. The end of the spindle 13 is formed to accommodate and cooperate in surface contact with the rounded surface of the ball 25 as appears in Fig. 5. The threaded member 22 is mounted in threaded engagement with tubular extension 26 of the boss 11. The threads of the threaded member 22 are forty to the inch and are of a type generally known to the art as micrometer threading. Mounted on the outer end of the threaded member 22 is a hollow cylindrical member 30 which is held in place by the thumb screw 31. This cylindrical member 30 is of sufficient diameter and length to permit it to extend over a substantial portion of the cylindrical extension 26 with substantial working clearance as is shown in Fig. 5. A hand wheel 32 is mounted with wedge-like surface contact on the tapered outer end of the cylindrical member 30 and is held integrally in place by means of a screw 33.

The hand wheel 32 is preferably made of materials such as plastic so as not to add to the weight of the instrument or to effect its accuracy.

On the inner end of the cylindrical member 30 there is mounted a rotatably adjustable collar 34. The collar 34 is held operatively in place by the screw 35 which extends into a circumferential channel 36 formed around the cylindrical member 30. The cylindrical surface of the collar 34 is graduated to provide a hardness scale to indicate the depth of penetration of the penetrator spindle 13 and the screw 35 is countersunk so as not to interfere operatively with a transparent marking finger 40 having a marking line 41 inscribed thereon. This marking finger 40 is mounted on the boss 11 by means of screws 42 so that the marking line 41 coordinates with the hardness scale on the collar 34. The hardness scale is preferably (although not necessarily) calibrated to indicate the depth of penetration in units of .0008 inch—the standard which is generally employed in the art. The details and operation of this hardness scale are fully set out in a co-pending patent application filed by me under Serial No. 607,681, July 30, 1945, which matured into Patent No. 2,448,645 September 7, 1948, of which this application is a continuation in part, and need not be repeated here.

It will be observed from Fig. 5 that the spindle 13 is mounted for free angular movement in the manner diagrammatically indicated in exaggeration in Fig. 6. It will be clear from Fig. 6 that this free angular movement of the spindle 13 is of prime importance in the operation of my invention. It is of first importance that the left hand end of the frame 10 in Fig. 6 move freely in the distortion of the frame 10 under testing pressure and that this motion be operatively transmitted to the load indicator 61 through the lever arm 60. The inner end of the spindle 13 is fitted with a removable tapered penetrator cap 45 of the same general type as described in detail in my co-pending patent application identified above. Since the operation and function of the penetrator cap 45 is the same as that of the penetrator cap described in my co-pending application including the different forms shown therein for different conditions, it will not be necessary to further describe the penetrator cap 45 here in order to explain the present invention which is not limited to any particular form of penetrator cap.

An adjustable anvil member 46 is mounted in threaded engagement in the boss 12 of the frame 10. The boss 12 is split at the top to form an axial opening in the top thereof and lugs 47 are formed on each side of this opening on top of the boss 12. An adjustment screw 50 extends through these lugs 47 with a butterfly nut 52 threadedly mounted on the end thereof. In this way the adjustable anvil 46 may be tightly gripped in place when an adjustment has been reached. A butterfly thumb nut 54 is mounted on the outer end of the adjustable anvil 46 for rotating the anvil 46 in adjustment.

A test specimen 55 is shown in place between the anvil 46 and the penetrator cap 45 in Fig. 1. Secured to the boss 11 of the yoke 10 is a handle bar 56 which extends downwardly and forwardly whereby the instrument may be held in the left hand while the tests are being made, so that the right hand may be employed in making necessary adjustments in operation. Riveted or otherwise permanently secured to the frame 10 near the boss 12 is a lever arm 60 which is fashioned from strong and comparatively rigid hardened sheet metal to the configuration shown. It is important that this lever arm 60 be as light as possible in view of its simple and sole function of operating a load indicator 61 mounted on the other end of the frame 10 in the proximity of the boss 11. It will be noticed from Fig. 3 that the lever arm 60 is spaced from the frame 10 so that the only contact between the lever arm 60 and the frame 10 is at its mounting near the boss 12. The free end 64 of the lever arm 60 is in operative contact with the operating plunger 65 of the load indicator 61. As the frame 10 is distorted as shown schematically in Fig. 6, the free end 64 of the lever arm 60 moves upwardly and thus allows the spring urged plunger 65 to move upwardly thereby causing the operation of the load indicator 61.

The load indicator 61 may be of any approved commercial type having a cylindrical casing 63 and a dial 64. The pointer or hand 65 of the indicator 61 is actuated through gear connections (not illustrated) by the spring biased plunger 65 which is confined to endwise movement in tubular guide projections 66 and 67, with its tapered end bearing laterally against the extension 64 of the operating arm 60 as previously described. The load indicator 61 is calibrated with numerals designating the zero and the 100 kg. and 150 kg. points as well as with the letter "I" which designates the 10 kg. point, these values being determined from actual dead weights used in calibrating. In order to permit adjustment by rotation, the mounting of the load indicator 61 on the frame 10 is effected by means of a threaded element or stud 57 mounted on the back of the casing 63 and extending through the frame 10. Conventional lock nuts 58 and 59 threadedly engage the element 57. In Fig. 1, such adjustment is illustrated in dotted lines showing the turning of the load indicator 61 to the left.

The manual operation of my invention is similar to the operation of the device shown in my above identified co-pending patent application. In making a test, for example, on a flat specimen 55, Fig. 1, the instrument is clamped over the specimen as shown and the spindle 13, rotated until the hand 65 of the load indicator 61 points to the graduation I with incidental flexure of the yoke or frame 10 whereby an initial load of 10 kg. is applied through penetrator cap 45 on the spindle 13 for surface penetration of the test piece. This preliminary surface penetration is important to avoid error resulting from surface irregularities in the test piece 55. The hardness indicator collar 34 is then set at zero and the spindle 13 turned tighter with further flexure of the frame 10 until the load indicator 61 reads, say, 100. Finally the spindle 13 is backed off until the load indicator 61 again stands at I indicating 10 kg. pressure when the reading of the hardness scale will indicate the degree of hardness of the specimen 55.

My invention has shown great capacity for accuracy because of the free angularity of the penetrator spindle 13 which permits the frame 10 to be temporarily distorted or flexed under the testing pressure without restraint due to the binding of a rigidly mounted penetrator spindle. Since the lever arm 60 is light, the effect of the force of gravity on the operation of this arm is greatly reduced. This permits the hardness indicator to be used in the inverted position without loss of accuracy. By providing an adjustable anvil member 46, I reduce the length of expensive micrometer threading required in connection with the adjustable penetrator spindle 13.

While I have described a preferred form of my invention in some detail, it will be clear to those skilled in the art that various modifications and changes may be made therein without departing from the spirit of the invention as hereinafter claimed.

I claim:

1. A hardness tester comprising a flexible frame, an adjustable anvil mounted in one end of said frame, a longitudinally adjustable penetrator spindle mounted in the other end of said frame with capacity for free angular movement, a load indicator mounted at one end of said frame and a lever arm mounted at the other end of said frame, said lever arm having a free end operatively contacting said load indicator.

2. A hardness tester comprising a flexible frame, an adjustable anvil mounted on one end of said frame, a threaded member adjustably mounted in threaded engagement on the other end of said frame, a penetrator spindle pivotally mounted at its outer end on the inert end of said threaded member, a flexible bearing mounted in a boss formed on said frame, said spindle extending through said flexible bearing in contact therewith, a load indicator mounted at one end of said frame and a lever arm mounted at the other end of said frame, said lever arm having a free end operatively contacting said load indicator.

3. A hardness tester comprising a semi-circular flexible frame, an adjustable anvil mounted on one end of the frame, a flexible bearing mounted on the other end of said frame, a longitudinally adjustable threaded member mounted on the same end of the frame as said flexible bearing and having a hand wheel mounted thereon, a penetrator spindle pivotally mounted at its outer end on the inner end of said threaded member and supported in said flexible bearing whereby free angular movement of said spindle is provided, a load indicator mounted on one end of the frame, a lever arm of comparatively light but rigid material mounted on the other end of the frame, the free end of said lever arm being in operative contact with the load indicator, an adjustable hardness scale mounted on a sleeve integrally attached to said threaded member, and an indicating finger mounted on said frame and extending into coordinated relation with said hardness scale.

4. A hardness tester comprising a flexible frame, an adjustable anvil mounted at one end of said frame, an adjustable penetrator element mounted at the other end of said frame with capacity for free angular movement, a hardness scale for measuring the penetration of said penetrator means, a load indicator mounted at one end of said frame, and a lever arm mounted at the other end of said frame from the load indicator, the free end of said lever arm being in operative contact with said load indicator.

5. A hardness tester having a flexible semi-circular frame including a handle member, a split boss formed on one end of said frame, an adjustable anvil threadly mounted in said split boss, adjustable means for compressing said split boss to grip said adjustable anvil in place, a second boss formed on the other end of said frame, said second boss having an outwardly projecting tubular extension formed thereon and a flexible ring-like bearing seated in said boss, an adjustable threaded member mounted within said tubular extension by micrometer threading, a penetrator spindle pivotally mounted on the inner end of said threaded member and extending through said flexible ring-like bearing seated within said second boss, an operating wheel mounted on the outer end of said threaded member, and having an inwardly extending tubular element carrying an adjustable hardness scale, an indicating finger mounted on said frame in coordinating operative relation to said hardness scale, a load indicator mounted on one end portion of said frame and an operating lever arm having one end rigidly mounted on the other end of the frame with the free end in operative contact with said load indicator.

6. A hardness tester comprising a flexible frame, an anvil mounted in one end of said frame, a longitudinally adjustable penetrator spindle mounted in the other end of said frame with capacity for free angular movement, a load indicator mounted at one end of said frame and a lever arm mounted at the other end of said frame, said lever arm having a free end operatively contacting said load indicator.

WILLIAM A. WILLIAMS.

REFERENCES CITED

The following references are of record in the file of this patent:

UNITED STATES PATENTS

| Number | Name | Date |
|---|---|---|
| 1,091,128 | Guillery | Mar. 24, 1914 |
| 1,384,389 | Johnson et al. | July 12, 1921 |
| 1,722,263 | Barry et al. | July 30, 1929 |
| 1,771,858 | Mohr | July 29, 1930 |
| 1,885,972 | Wilson | Nov. 1, 1932 |
| 1,973,333 | Creamer | Sept. 11, 1934 |

FOREIGN PATENTS

| Number | Country | Date |
|---|---|---|
| 16,588 | Great Britain | 1909 |
| 212,916 | Great Britain | Dec. 8, 1924 |